Nov. 28, 1950      B. A. McKEAN      2,531,456
STUD SETTING DEVICE
Filed Dec. 12, 1944      2 Sheets-Sheet 1
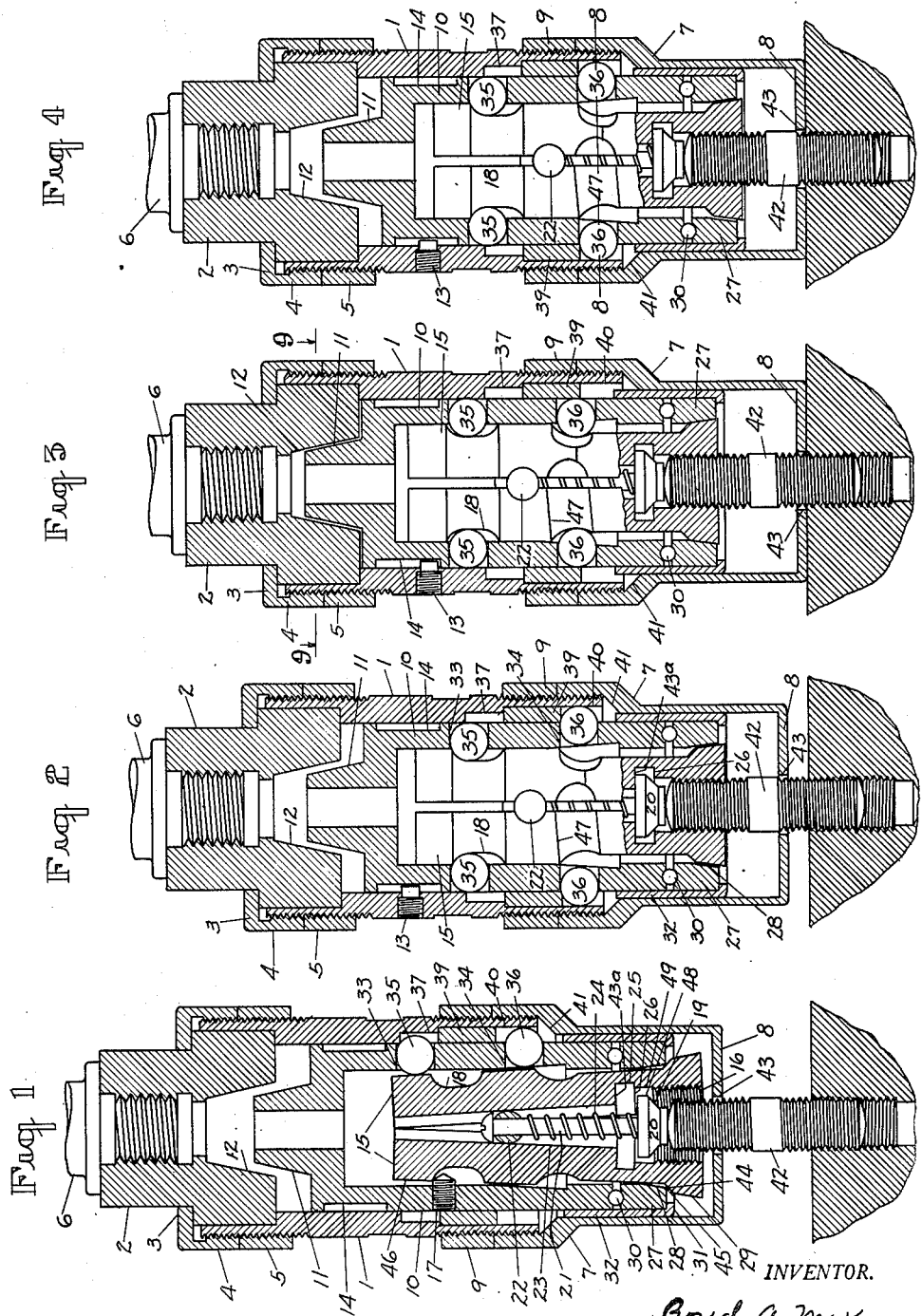
INVENTOR.
BY Boyd A. McKean
Ralph Hammar
attorney Nov. 28, 1950     B. A. McKEAN     2,531,456
STUD SETTING DEVICE
Filed Dec. 12, 1944     2 Sheets-Sheet 2
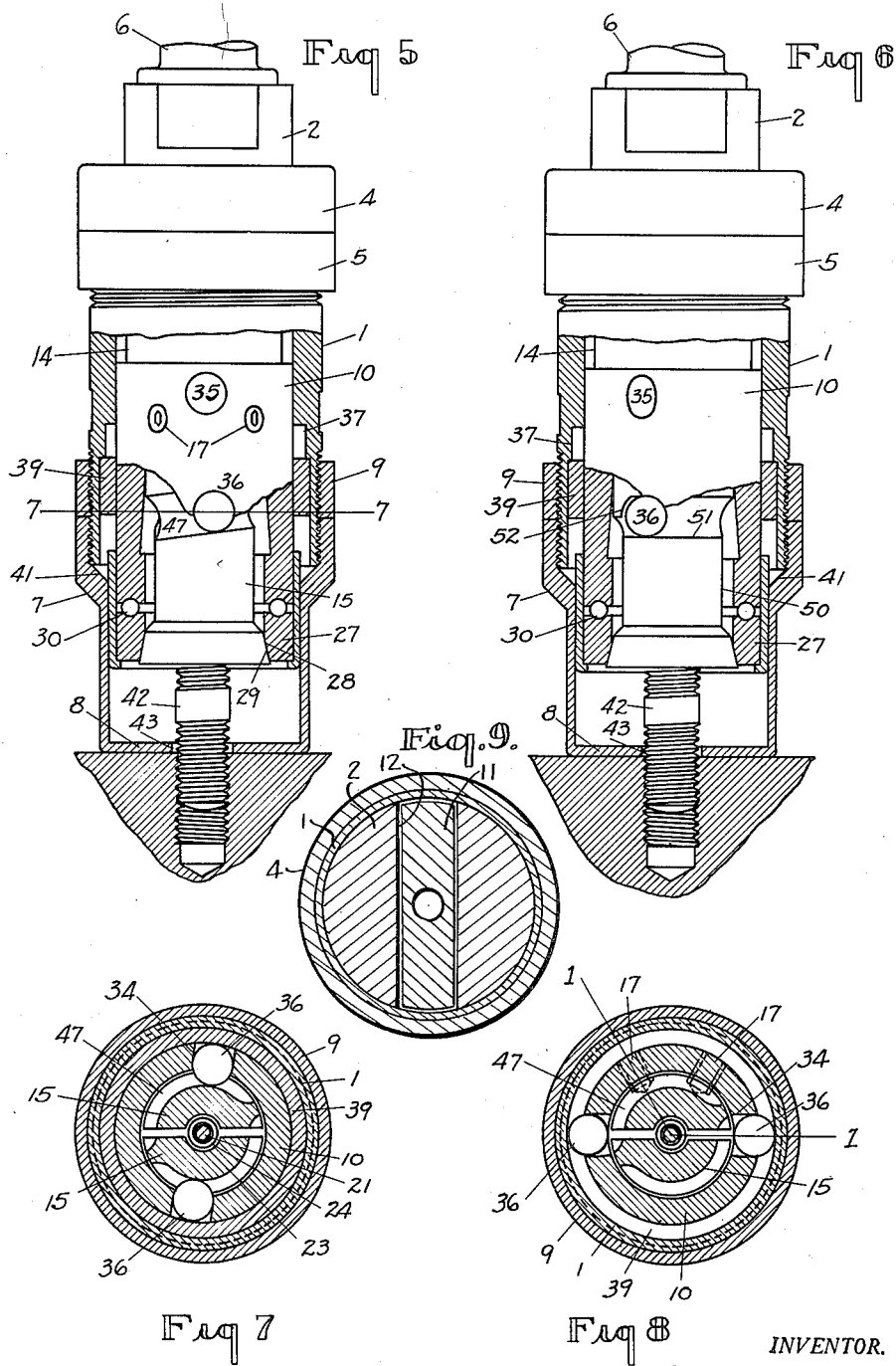
INVENTOR.
Boyd A. McKean
BY Ralph Hammar
attorney Patented Nov. 28, 1950

2,531,456

UNITED STATES PATENT OFFICE 2,531,456

STUD SETTING DEVICE

Boyd A. McKean, Erie, Pa., assignor to Titan Tool Company, Fairview, Pa., a corporation of Pennsylvania Application December 12, 1944, Serial No. 567,886

10 Claims. (Cl. 81—53)

The present invention relates to stud setting devices in which the jaws are clamped on the threads of the stud and then clutched to a driving head. The driving torque is utilized to clamp the jaws, compensating for wear and in one form obtaining the higher clamping pressure required for plated studs. A cam ring journaled on the head is used to wedge the jaws facilitating the release of the jaws and eliminating the need for declutching the head. Further objects and advantages appear in the specification and claims.

In the accompanying drawings, Fig. 1 is a sectional view on line 1—1 of Fig. 8 of a stud setting device with the parts positioned at the start of the stud setting operation; Fig. 2 is a sectional elevation showing the jaws clamped on the stud; Fig. 3 is a similar view showing the jaws clutched to the head of the stud partly driven; Fig. 4 shows the position of the parts at the end of the stud setting operation; Fig. 5 is an elevation partly broken away of the stud setting device; Fig. 6 is an elevation of the stud setting device with a different type of jaw; Fig. 7 is a sectional view on line 7—7 of Fig. 5; Fig. 8 is a sectional view on line 8—8 of Fig. 4 and Fig. 9 is a section on line 9—9 in Fig. 3 through the tapered clutch jaw.

In the drawing, 1 indicates the driving member which comprises a sleeve having a clutch 2 loosely held in its upper end by a flange 3 on a threaded retaining ring 4 held in place by a locking ring 5. The clutch member 2 is threaded to receive a shank 6 for attachment to a driving motor. At the lower end of the sleeve 1 is threaded a spacing sleeve 7 having a flange 8 for engaging the part in which the stud is to be driven and stop the driving of the stud. The spacing sleeve is locked in adjusted position by a locking ring 9. Slidably received within the sleeve 1 is a head 10 having a tapered non-circular clutch jaw 11 receivable in a slot 12 in the clutch member 2. The axial sliding of the head 10 is limited by a set screw 13 which fits in an annular groove 14 in the head. The width of the groove 14 is such that the jaw 11 is never completely removed from the slot 12. The head 10 is therefore continuously driven.

Slidably received within the head 10 are split jaws 15 having threaded stud gripping jaws 16. The jaws are retained within the driving head by set screws 17, the inner ends of which are receivable in annular grooves 18 in the jaws. In the lowermost position of the jaws shown in Fig. 1, the lower ends of the jaws are spread by a cam surface 19 on a stop plug 20 having a shank 21 slidably received in a pin 22 held in mating grooves 23 in the jaws 15. The stop plug is urged downward by a coil spring 24 arranged between the pin 22 and the head of the plug 20.

When the jaws are in the stud gripping position, the plug 20 is received within an annular recess 25 in the jaws and the cam surface 19 is slightly above a shoulder 26 at the lower end of the recess 25. In this position the jaws are cammed together by a cam ring 27 having a conical cam surface 28 which cooperates with a conical surface 29 on the jaws. The cam ring 27 is journaled on the lower end of the head 10 by a ball thrust bearing 30. The cam ring is held on the lower end of the head by an inwardly extending flange 31 at the lower end of a sleeve 32 fixed to the head. In the head are sockets 33 and 34 receiving retaining balls 35 and clutch balls 36.

During the use of the stud setting device the head 10 is continuously driven and the balls 35 and 36 are urged outward by centrifugal force. In the position shown in Fig. 1 the retaining balls 35 are received in an annular groove 37 in the sleeve 1 having its lower edge defined by the upper edge of a cam ring 39 pressed into the sleeve. The balls 36 are received in an annular groove 40 having its upper edge defined by the lower edge of the cam ring 39 and its lower edge defined by a tapered surface 41 of the spacing sleeve 7.

At the start of the stud driving operation, the driver is positioned over a stud 42 which is received through an opening 43 in the flange 8 at the lower end of the spacing sleeve 7. As the stud driver is lowered the upper end of the stud strikes the stop plug 20 and moves the plug upward into engagement with the surfaces 43a on the jaws, moving the jaws inward within the head 10. During the initial inward movement the jaws are cammed together by cam surfaces 44 on the jaws which cooperate with the lower edge 45 of the cam ring. Upon further inward movement the jaws are cammed together by the tapered surface 28 on the cam ring. During this part of the inward movement of the jaws the head 10 is retained in the position illustrated in Fig. 1 by the retaining balls 35 which are prevented from moving radially inward by surfaces 46 on the upper ends of the jaws. At the end of the initial inward movement of the jaws the groove 18 in the jaws comes opposite the retaining balls 35 and continued inward pressure is transmitted from the jaws through the surfaces 28 and 29 to the head forcing the head inward within the sleeve 1 and causing the balls 35 to be cammed into the retaining groove 18 by engagement with the upper edge of the groove 37. At this point the parts of the driver are in the position illustrated in Fig. 2 in which the threaded ends 16 of the jaws are clamped on the upper end of the stud and are locked in the clamped position by the retaining balls 35 which are now positioned between the retaining groove 18 and the inner surface of the sleeve 1 above the groove 37. While the jaws are clamped on the stud, the jaws do not rotate since the cam ring 27 which cams the jaws against the stud is journaled on the head.

As the lowering of the stud driver is continued, the head slides inward within the sleeve 1 to the position illustrated in Fig. 3 in which the clutch balls 36 are cammed out of the groove 40 by engagement with the lower edge of the cam ring 39 into inclined grooves 47 in the jaws 15. The grooves are inclined circumferentially at an angle less than 45° to a plane normal to the axis of the driver and in a direction such that the driving force causes an inward movement of the jaws.

The pitch of the grooves 47 is such that the normal driving position of the balls 37 is part way along the length of the grooves as illustrated in Fig. 5. The head 10 rotates relative to the jaws 15 until further inward movement of the jaws in the head is prevented by the pitch of the grooves 47. The inclined grooves 47 cause the jaws to be drawn inward by the driving torque providing the tight grip on the studs desirable for driving plated studs.

At the start of the stud driving operation the flange 8 of the spacing sleeve 7 is spaced from the work and slightly below the position illustrated in Fig. 2. As the stud driving operation continues the driver moves downward as a unit to the position illustrated in Fig. 3 in which further downward movement of the sleeve 1 is prevented by engagement of the spacing sleeve with the work. From this point the head 10 and the jaws 15 move downward with the stud to the position illustrated in Fig. 4 in which the clutch balls 36 come opposite the groove 40 and are moved into the groove by centrifugal force breaking the driving connection to the stud although the jaws are still clamped to the stud. The stud driver is released by an upward pull on the driver.

During the initial upward movement of the driver, the retaining balls 35 come opposite the groove 37 and are moved into the groove by centrifugal force, unlocking the jaws from the head 10. Upon further upward movement of the driver, the set screw 13 engages the upper edge of the groove 14 and stops the outward movement of the sleeve 1 relative to the head. At this point the upward pull on the driver is effective to break the cam surface 28 away from the jaws and permit the downward movement of the jaws by the spring 24. The force of the spring 24 is transmitted to the jaws through the cam surfaces 19 causing the jaws to spread to the position illustrated in Fig. 1 in which the lower ends of the jaws project beyond the cam ring 27. The jaws are held in the spread position by surfaces 48 and 49 on the plug 20 and jaws 15 which prevent closing of the jaws until the plug 20 has been moved inward.

For driving unplated studs the increased jaw clamping pressure provided by the grooves 47 is unnecessary. For these studs the jaws 50 have straight grooves 51 terminating in shoulders 52. The lower ends of the shoulders 52 are cut away so that the clutch balls 36 tend to ride under the lower ends of the shoulders and cam the jaws inward. The pitch of the shoulders 52 is such that a smaller clamping force is derived from the driving torque. The clamping force increases with the use of the driver due to the wearing away of the lower ends of the shoulders 52. This partially compensates for the additional clamping pressure needed as the threaded clamping surfaces 16 of the jaws wear.

In the sequence of operation from the beginning, the jaws 15 (or 50) are moved into the head 10 until the groove 18 is opposite the retaining balls 35. The jaws and head then move inward as a unit and the retaining balls are cammed out of the groove 37 locking the jaws in the head against outward movement and holding the jaws clamped against the stud. Upon further inward movement of the jaws and head, the clutch balls 36 are cammed into the grooves 47 (or 51) establishing the drive to the stud. The jaws now move inward relative to the head to increase the clamping pressure on the stud threads. This inward movement is permitted by the width of the groove 18. The sequence in which the balls 35 and 36 are cammed is controlled by the spacing of the upper edges of the grooves 37 and 40 which is slightly less than the spacing between the centers of the balls 35 and 36. The sequence is reversed at the end of the stud driving operation.

In use the lower edge of the cam ring 39 tends to become rounded. When this happens, the ring is removed, reversed and pressed into place. The rounded end of the ring 39 is now at the lower edge of the groove 37. Until both ends of the cam ring have become rounded reconditioning of the driver is unnecessary.

The high thread clamping pressure extends the life of the jaws which will operate satisfactorily even after the threads have become worn. The freely rotatable cam ring 27 facilitates the release of the jaws from the stud at the end of the driving operation. If the ring were rigid with the head 10, the jaws would tend to seize in the ring and would fail to release even though the balls 36 were cammed out of the grooves 47 (or 51).

What I claim as new is:

1. In a stud setting device, an axially slidable head, a drive for the head, jaws axially slidable in the head, a cam surface journaled on the head and cooperating to wedge the jaws together upon inward movement of the jaws, and a clutch between the jaws and head engaged by subsequent inward movement of the jaws and head, said clutch having an inclined torque transmitting surface inclined circumferentially at an angle of less than 45° to a plane normal to the axis of the driver and in a direction such that the driving torque exerts an inward force on the jaws tending to wedge the jaws together.

2. In a stud setting device, a head, a drive for the head in which the head is axially slidable, jaws slidable in the head, a cam surface journaled on the head and cooperating to wedge the jaws together to close against an inserted stud upon inward movement of the jaws in the head, latch means retaining the head against inward movement, said latch means being released by closing movement of the jaws on a stud, balls recessed in the head, and a driving surface on the jaws between the jaws and head engageable with the balls upon inward movement of the jaws and head to establish a driving connection to the jaws.

3. In a stud setting device, a head, a drive for the head, jaws axially slidable in the head, a cam surface journaled on the head and cooperating to wedge the jaws together upon inward movement of the jaws, balls recessed in the head, and a driving surface on the jaws between the jaws and head engageable with the balls upon inward movement of the jaws to establish a driving connection to the jaws, said surface being circumferentially inclined at an angle of less than 45° to a plane normal to the axis of the driver and in the direction to cause inward movement of the jaws due to the driving torque.

4. In a stud setting device, a driving member, a head continuously driven thereby and axially slidable therein, jaws slidable in the head, a cam surface journaled on the head and cooperating to wedge the jaws together upon inward movement of the jaws, a clutch member carried by the head and received into the driving member, a driving surface on the jaws moved into register with the clutch member upon inward movement of the jaws, and means for camming the clutch member into engagement with the driving surface upon inward sliding of the head.

5. In a stud setting device, a driving member, a head slidable in the driving member, jaws axially slidable in the head, a cam surface journaled for rotation relative to the head and cooperating to wedge the jaws together upon inward movement of the jaws, latch members in the head preventing inward movement of the head until the jaws are moved inward, and a drive from the driving member through the head to the jaws engaged upon subsequent inward movement of the head and jaws including torque transmitting surfaces between the head and jaws inclined circumferentially at an angle of less than 45° to a plane normal to the axis of the driver and in a direction exerting a force tending to move the jaws inward relative to the head.

6. In a stud setting device, a driving member, a head slidable in the driving member, jaws slidable in the head, a cam surface cooperating to wedge the jaws together upon inward movement of the jaws, a retaining groove in the jaws, a clutch surface in the jaws, balls recessed on the head successively cammed into the groove and into the clutch surface upon inward movement of the head, and a drive between the driving member and head.

7. In a stud setting device, a driving member, a head slidable in and driven by the driving member, jaws slidable in the head, a cam surface journaled on the head wedging the jaws together upon inward movement of the jaws, a retaining groove at the inner end of the jaws, a clutch surface on the jaws, axially spaced retaining and clutch balls recessed in the head and partially receivable in cam grooves in the driving member, surfaces on the jaws holding the balls in the cam grooves until the jaws are moved to the inner position, a cam surface on the cam groove for the retaining balls camming the retaining balls into the retaining groove upon initial inward movement of the head, and a cam surface in the groove for the clutch balls camming the clutch balls against the clutch surface upon subsequent inward movement of the head.

8. In a stud setting device, a driving member, a head slidable in the driving member, jaws slidable in the head, a cam surface journalled on the head cooperating to wedge the jaws together upon inward movement of the jaws, latch members preventing inward movement of the head until the jaws are moved inward, and clutch members in the head moved into engagement with the jaws by inward movement of the head.

9. In a stud setting device, a driving member having a stop for engaging the work into which the stud is being driven, a head axially slidable in the driving member, jaws slidable and rotatable in the head, a cam surface on the head cooperating to wedge the jaws together to close the jaws against an inserted stud upon inward movement of the jaws relative to the head, latch means preventing inward movement of the head until the jaws are moved inward, and a drive from the driving member through the head to the jaws engaged upon subsequent inward movement of the head and jaws including torque transmitting surfaces between the head and jaws inclined circumferentially at an angle of less than 45° to a plane normal to the axis of the driver and in a direction exerting a force tending to move the jaws inward relative to the head.

10. In a stud setting device, a driving member having a cylindrical bore with an annular groove in its inner surface, a head axially slidable in the bore of the driving member, said head having a cylindrical jaw receiving cavity, jaws axially slidable and rotatable in the jaw receiving cavity, balls recessed in the head and normally projecting into said groove, means blocking inward movement of the balls until the jaws are moved inward relative to the head, a cam surface cooperating to wedge the jaws together to close the jaws against an inserted stud upon inward movement of the jaws relative to the head, a circumferentially inclined surface in the jaws coming opposite said balls upon said inward movement of the jaws against which the balls are cammed upon subsequent inward movement of the jaws and head, and a drive from the driving member to the head, said circumferentially inclined surface being inclined at an angle of less than 45° to a plane normal to the axis of the driver and in a direction to cause inward movement of the jaws due to the driving torque.

BOYD A. McKEAN.

REFERENCES CITED

The following references are of record in the file of this patent:

UNITED STATES PATENTS

| Number | Name | Date |
| --- | --- | --- |
| 1,155,662 | Kleinsteuber | Oct. 5, 1915 |
| 1,807,265 | Walker | May 26, 1931 |
| 1,817,049 | Weil | Aug. 4, 1931 |
| 2,034,740 | Brandt | Mar. 24, 1936 |
| 2,086,167 | Lamb | July 6, 1937 |
| 2,251,491 | Lozen | Aug. 5, 1941 |
| 2,405,772 | Adams et al. | Aug. 13, 1946 |